UNITED STATES PATENT OFFICE 2,691,567

POLYMERIC ORGANIC PHOSPHORUS COMPOUNDS FOR INCREASING FLAME RESISTANCE OF TEXTILES AND METHOD OF USING SAME

Donovan E. Kvalnes, Penns Grove, and Neal O. Brace, Woodstown, N. J., assignors to E. I. du Pont de Nemours & Company, Wilmington, Del., a corporation of Delaware No Drawing. Application October 23, 1951, Serial No. 252,812

4 Claims. (Cl. 8—115.5)

This invention relates to polymeric organic compounds containing phosphorus and particularly to such compounds which also contain a grouping which is an addition product of two isocyanate radicals. It further relates to new organic compounds which are useful in increasing the flame resistance and in imparting antistatic properties to textiles.

Phosphorus compounds, and particularly organic phosphorus compounds, have been applied to fabrics and films to obtain a variety of useful effects such as flame resistance, anti-static properties and insect-proofing. These effects however have not been permanent, as the treating agents are ordinarily removed by laundering or by dry-cleaning.

Efforts have been made to overcome this fault by applying the phosphorus compounds in company with resins to fasten the compounds to the surface. While this has resulted in some improvement, the durability of the fabric so treated is not great and repeated laundering or dry-cleaning removes the surface treatment. It has been recognized that if the phosphorus compounds could be attached to the surface of the fabric or film by a true chemical union, a permanent effect could be obtained. Heretofore all such attempts have resulted in the severe tendering of the fabric due to the strenuous conditions needed to bring about chemical reaction. Such treatments are obviously not practical.

It is an object of this invention to provide a new series of polymeric organic phosphorus compounds which may be applied to textiles and which may be chemically bonded thereto without injury to the textile. A further object is to provide organic phosphorus compounds which are not removed by repeated launderings after bonding to the fabrics. A further object is to provide a process of bonding the new phosphorus-containing polymers of this invention to textile materials. Further objects will appear from the detailed description of this invention which follows.

The new phosphorus-containing compounds of this invention are derivatives of hydroxyl-containing polymers selected from the class consisting of cellulose, starch, polyvinyl alcohol and polyallyl alcohol, in which derivative aromatic diisocyanate dimers are attached to the polymer by means of urethane linkages formed from an isocyanate radical of the dimer and a hydroxyl group of the polymer, said dimers being attached in from 5 to 95% of the positions occupied by hydroxyl groups in the parent polymer, and in which from 5 to 95% of the hydroxyl groups in the parent polymer are replaced by substituted phosphate, phosphonate or phosphinate radicals. A representative member of this class of compounds is the polymer obtained by partially esterifying a polyvinyl alcohol with diethyl phosphoric acid and thereafter reacting with the dimer of 2,4-tolylene diisocyanate.

The radical containing phosphorus may be represented generally by the expression:

in which A contains from 1 to 12 carbon atoms and is a member of the group consisting of alkyl and alkoxy radicals and B contains from 1 to 12 carbon atoms and is a member of the group consisting of alkyl, aryl, alkoxy and aryloxy radicals. The radical may be a phosphate group, for example, using methyl as the hydrocarbon part of the substituents:

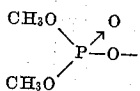

or a phosphonate:

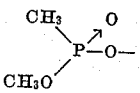

or a phosphinate:

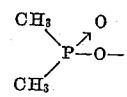

The substituents A and B may be alkyl radicals such as methyl, ethyl, propyl, isopropyl, n-butyl, hexyl, octyl, or dodecyl, or the corresponding alkoxy radicals. They may be the same or different. Alternatively, B may be an aryl radical such as phenyl, tolyl, xylyl, naphthyl, biphenyl and the like or the corresponding aryloxy radical.

The aromatic diisocyanate dimers which are used in the production of the compounds of this invention may be formed by the catalytic dimerization of aromatic isocyanates, preferably in the presence of a catalyst such as phenyldimethylphosphine, as disclosed in copending application Serial No. 248,270 of Otto Stallmann, filed September 25, 1951. During the dimerization, an isocyanate radical from one monomeric molecule reacts with an isocyanate radical from a second molecule to give an addition product which probably has one of the following structures:

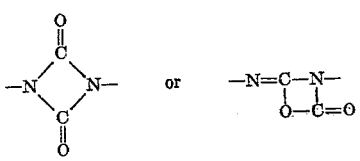

The dimerization reaction may be represented as follows, using 2,4-tolylene diisocyanate as an example and letting D stand for the addition product of two isocyanate radicals:

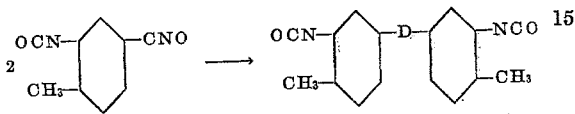

Whatever their structure, these dimeric addition products do not share the well-known instability of free isocyanate radicals with respect to water and other materials containing active hydrogen. The dimers, which contain such addition products and which also contain free isocyanate radicals, may be reacted with the hydroxyl-containing polymer such as polyvinyl alcohol to give stable products which may be stored without special precautions and without deterioration. By subsequently heating the polymer to a temperature of 125 to 225° C. the dimeric isocyanate addition products are ruptured, forming reactive groups which can combine readily with compounds containing active hydrogen atoms such as are present in amino, amido, hydroxyl and carboxyl radicals. Polymers containing phosphorus and also containing such dimeric isocyanate addition products may therefore be applied to fabrics or films composed of materials such as cotton, wool, or nylon which contain active hydrogens and may be strongly bonded thereto simply by heating the treated textile.

In the aromatic diisocyanate monomers from which the dimers are prepared, at least one of the isocyanate groups must be attached to an aromatic ring. Compounds of this type include 2,4-tolylene diisocyanate, 4-chloro-1,3-phenylene diisocyanate, 2-chloro-1,4-phenylene diisocyanate, 2-methoxy-1,4-phenylene and 2-nitro-1,4-phenylene diisocyanate. Other usable diisocyanates include compounds such as

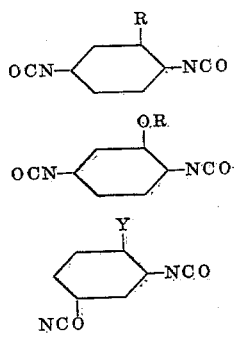

in which Y represents an ester group such as —OOCR or —COOR and in which R represents an alkyl, aryl, aralkyl or cycloalkyl group of from 1 to 10 carbon atoms. The aromatic nucleus may also be substituted with a tertiary amino group as in the compound

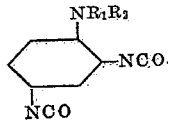

in which $R_1$ and $R_2$ represent alkyl, aryl, aralkyl or cycloalkyl groups, the total number of carbon atoms in $R_1$ and $R_2$ being from 2 to 12. Other diisocyanates containing a single phenyl group which are useful in the process of this invention are

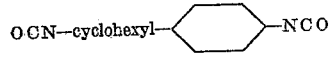
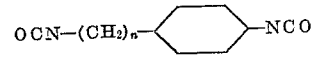

or

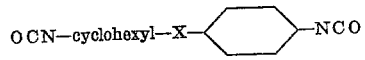

in which X represents O, S, CO, $SO_2$ or $(CH_2)_n$, and similar compounds in which X represents an alkylene group which is interrupted by a hetero atom such as oxygen, sulfur or nitrogen. In these compounds $n$ may be from 1 to 12. The diisocyanates may contain naphthyl groups as in

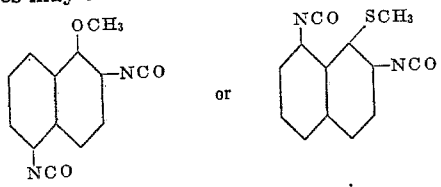

or a plurality of phenyl groups as in

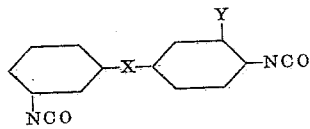

where X is O, S, CO, $SO_2$, CH=CH, N=N, $(CH_2)_n$ or an alkylene group which is interrupted by a hetero atom such as oxygen, sulfur or nitrogen, where Y is a saturated or unsaturated hydrocarbon group, an ether group, an ester group, a tertiary amino group, —NCS, halogen or nitro, and where $n$ is from 1 to 12.

The hydroxyl-containing polymers from which the products of this invention are derived are selected from the class consisting of cellulose, starch, polyvinyl alcohol and polyallyl alcohol. These polymers may be modified by having part of their hydroxyl groups substituted with various materials other than the phosphorus containing radicals and the aromatic isocyanate dimers. They may be partially esterified or etherified. Examples of such materials include cellulose mono- and diacetate, partially hydrolyzed polyvinyl acetate or chloride, allyl starch, carbomethoxycellulose and the like.

The new polymers are preferably prepared by first reacting the hydroxyl-containing polymer with a substituted phosphoryl halide, until from 5 to 95% of the hydroxyl groups present in the parent polymer have been esterified, and thereafter reacting with the aromatic diisocyanate dimer until the dimers are attached to the polymer in from 5 to 95% of the positions originally occupied by hydroxyl groups in the parent polymer. By the term "parent polymer" is meant the cellulose, starch, etc. in which none of the hydroxyl groups have been reacted either with phosphorus radicals, isocyanate groups, or other modifying groups. Thus in a hydrolyzed polyvinyl acetate, the term "parent polymer" refers to the completely unesterified polyvinyl alcohol, of which the acetate may be considered a derivative, rather than to the partially hydrolyzed polyvinyl acetate itself.

The reactions involved in a typical preparation may be represented as follows, using a polyvinyl alcohol as the polymer, diethyl chlorophosphate as the phosphorus compound, and the dimer of 2,4-tolylene diisocyanate as the isocyanate. As before, D stands for an addition product of two isocyanate radicals.

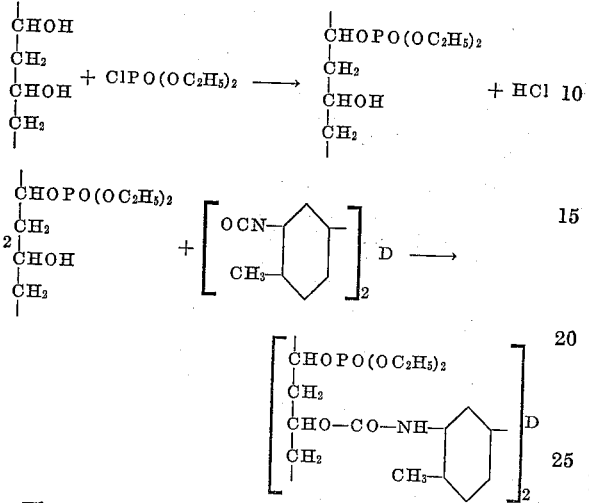

The products of this invention and the mode of using them are illustrated by the following examples, in which parts are by weight.

*Example 1*

Diisopropyl polyvinyl phosphate is prepared by reacting 22 parts of a low viscosity, 90% hydrolyzed polyvinyl alcohol with 97 parts of diisopropyl chlorophosphate in 392 parts of dry pyridine by stirring overnight at room temperature. The pyridine is then steam distilled while neutralizing the mass with sodium carbonate to decompose the pyridine hydrochloride formed in the reaction. The aqueous salt solution is then separated from the viscous syrup of diisopropyl polyvinyl phosphate. This syrup is dried in a vacuum oven at 60° C. It contains 10% phosphorus by analysis. This corresponds to esterification of 30% of the hydroxyl groups in the original polymer.

Five (5) parts of the diisopropyl polyvinyl phosphate are mixed with 0.5 part of the addition product formed by dimerizing 2,4-tolylene diisocyanate by known methods. The mixture is stirred while being heated on the steam bath. It gradually becomes stiffer and loses the tackiness characteristic of the polyvinyl phosphate. It then becomes solid. The solid is extracted successively with hot benzene and ethyl alcohol and the residue is dried. The resulting solid is analyzed and shows 2.6% N and 9.4% P.

When heated, the solid first softens and then solidifies. On heating in a flame it does not support combustion.

*Example 2*

Di-n-butyl polyvinyl phosphate is prepared as in Example 1 by substituting di-n-butyl chlorophosphate for the diisopropyl chlorophosphate. The product contains 11.9% P, corresponding to esterification of 65% of the hydroxyl groups. Ten (10) parts of the di-n-butyl polyvinyl phosphate are dissolved in 25 parts of ethylene dichloride and 0.42 part of the dimer prepared from 2,4-tolylene diisocyanate is stirred in with warming. A viscous gel-like product results. It is diluted with more solvent and stirred to form a thin syrupy mass.

This syrup is padded onto 8-ounce cotton herringbone twill. The solvent is allowed to evaporate in the air. The cloth shows a 22.4% gain in weight and contains 2.28% P and 0.16% N. The impregnated cloth is then heated to 200–220° C. for 2 to 3 minutes to bond the treating agent.

The cloth is then subjected to laundering at 160° F. with a tallow soap solution. After rinsing and drying, analysis of the cloth shows 1.54% P and 0.17% N. The cloth is not stiffened or tendered by the treatment. When the cloth is treated with the di-n-butyl polyvinyl phosphate alone and washed, only about half as much is retained on the cloth after laundering.

*Example 3*

The thin syrupy reaction mass of Example 2 is used to impregnate a strip of the 8-ounce cotton herringbone twill weighting 5.36 parts. The cloth when freed of solvent weighs 6.70 parts or an "add-on" of 1.34 parts, which is 25.0% of the original weight of the cloth. The impregnated strip is heated at 200° C. for 3 minutes. The cloth then contains 2.74% P and 0.23% N by analysis. After laundering at 160° F. for 30 minutes with 200 parts of 0.5% tallow soap solution and drying, it analyzes 2.19% P and 0.16% N. It is then tested for flame resistance by the Tentative Test Method 34–47 described on page 118 of the Technical Manual and Year Book of the American Association of Textile Chemists and Colorists, volume XXVI (1950). It shows a four inch char length and no afterglow. The flame on the cloth is self-extinguished. Untreated cloth burns completely on this test.

When the thin syrupy reaction mass is spread out into a thin layer and heated at 110° C. for several hours, a somewhat tacky film adhering firmly to the surface is obtained. This film is flame resistant. Thus it can be utilized as a flame resistant laminating agent.

In place of the polyvinyl alcohol, other macromolecular polyalcohols such as starch, cellulose, polyallyl alcohol, etc. may be used with similar results.

The polymeric phosphorus compounds containing dimeric isocyanate addition products may be applied to fabrics or films from solvents or emulsions, dried and then heated to about 125 to 200° C. to rupture the isocyanate adducts and thus generate reactive groups, which are presumably nascent —NCO groups. These groups will then react with active hydrogens on the surface of the fabric or film to form urethane type linkages, thus chemically binding the molecule to the surface. The hydroxyl groups in cotton, viscose rayon and acetate rayon, the imino groups in nylon, and the hydroxyl and carboxyl groups in terephthalic acid polyesters contain active hydrogens through which these agents may be bonded.

The phosphorus compounds thus linked to the surface are not removed by repeated launderings or dry-cleanings. Ordinary abrasion will not remove them. Removal requires either extreme abrasion or strong hydrolytic conditions, either of which will destroy or practically destroy the surface as well as the chemical bond between the phosphorus containing molecule and the surface.

The compounds of this invention may usually be applied to surfaces as emulsions. The emulsion may be made in known ways by use of emulsifying agents with or without the aid of special machinery. Thus the solid may be ground finely and dispersed in water with the aid of a nonionic emulsifying agent such as the condensation product of oleyl alcohol with 16-18 moles of ethylene oxide. A colloid mill may be used to aid the dispersion. By a different procedure, an emulsifying agent such as diethyl cyclohexylamine hexadecyl sulfate may be added to the solvent solution of the compound and then water may be added slowly with vigorous agitation. At first a water-in-solvent emulsion will form which will then invert to form a phosphate compound/solvent-in-water emulsion. The emulsion may be padded onto the fabric by passing the fabric continuously into the emulsion and then through a nip roll to remove the excess, after which the fabric may be continuously dried at a temperature of not over 100-105° C. This upper temperature limit is essential so that the dimeric compounds are not split prematurely. After drying, the coated fabric is stable under ordinary conditions for at least several days and may be stored and cured when desired. In the curing or fixation step the fabric may be passed continuously through an oven at 125° to 200-225° C. to cause the dimers to split and allow the reactive groups to combine with the active hydrogen atoms on the surface.

The impregnation of the fabric may be carried out in various other ways. The emulsion may be sprayed onto the surface or if it is thick it may be spread on with a blade such as a doctor knife. A solution of the compound in a solvent may be employed but generally an emulsion is preferable since special solvent recovery equipment may thereby be dispensed with.

The extent of the effect which is produced on the fabric by the treating agents of this invention will be in rough proportion to the amount of agent applied and to the phosphorus content of the agent. The phosphorus compounds of this invention ordinarily contain from about 2 to 16% by weight phosphorus. Loadings which result in as much as 1.5% phosphorus by weight on the textile usually produce self-extinguishing properties in the treated material, while loadings which give from 2.5 to 3% phosphorus on the textile result in excellent flame resistance. Still larger amounts may in some cases be applied, up to about 5%. On the other hand, applications of as little as 0.05% by weight of treating agent produce some anti-static effect and when this is the principal objective sought, considerably smaller applications of the phosphorus compounds will be made than when flame resistance is primarily desired.

Monomeric phosphorus compounds containing dimeric isocyanate addition products are disclosed and claimed in our copending application Serial No. 252,811, filed October 23, 1951.

We claim:

1. A phosphorus-containing derivative of a hydroxyl-containing polymer selected from the class consisting of cellulose, starch, polyvinyl alcohol and polyallyl alcohol, in which derivative the residues of dimers of aromatic diisocyanates, the said residues being the portions of the dimers remaining after the removal of free isocyanate groups, are attached to the polymer by means of urethane linkages formed from a free isocyanate group of the dimer and a hydroxyl group of the polymer, said dimer residues being attached in from 5 to 95% of the positions occupied by hydroxyl groups in the parent polymer, and in which from 5 to 95% of the hydroxyl groups in the parent polymer are replaced by a phosphorus-containing group having the formula

in which A contains from 1 to 12 carbon atoms and is a member of the group consisting of alkyl and alkoxy radicals, and B contains from 1 to 12 carbon atoms and is a member of the group consisting of alkyl, aryl, alkoxy and aryloxy radicals.

2. The product of claim 1 in which the hydroxyl-containing polymer is polyvinyl alcohol.

3. A phosphorus-containing derivative of polyvinyl alcohol wherein the residues of dimers of 2,4-tolylene diisocyanate, the said residues being the portions of the dimers remaining after the removal of free isocyanate groups, are attached to the polyvinyl chain by means of urethane linkages, formed from a free isocyanate group of the dimer and a hydroxyl group of the polyvinyl alcohol, said dimer residues being attached in from 5 to 95% of the positions occupied by hydroxyl groups in the polyvinyl alcohol and in which from 5 to 95% of the hydroxyl groups in the parent polymer are esterified with diisopropyl phosphoric acid.

4. A method of increasing the flame resistance of textile materials in which the fiber molecules contain active hydrogen atoms which comprises applying to the surface of the said textile a phosphorus-containing derivative of a hydroxyl-containing polymer selected from the class consisting of cellulose, starch, polyvinyl alcohol and polyallyl alcohol, in which derivative the residues of dimers of aromatic diisocyanates, the said residues being the portions of the dimers remaining after the removal of free isocyanate groups, are attached to the polymer by means of urethane linkages formed from a free isocyanate group of the dimer and a hydroxyl group of the polymer, said dimer residues being attached in from 5 to 95% of the positions occupied by hydroxyl groups in the parent polymer, and in which from 5 to 95% of the hydroxyl groups in the parent polymer are replaced by a phosphorus-containing group having the formula

in which A contains from 1 to 12 carbon atoms and is a member of the group consisting of alkyl and alkoxy radicals, and B contains from 1 to 12 carbon atoms and is a member of the group consisting of alkyl, aryl, alkoxy and aryloxy radicals, said derivative being dispersed in a liquid, and thereafter heating the treated textile to a temperature from 125° to 225° C.

References Cited in the file of this patent

UNITED STATES PATENTS

| Number | Name | Date |
| --- | --- | --- |
| 2,277,083 | Dorough | Mar. 24, 1942 |
| 2,495,108 | Kosolapoff | Jan. 17, 1950 |

OTHER REFERENCES

Blair et al., Journal American Chem. Soc., vol. 56, pp. 907 to 910, 1934.